March 30, 1965    J. DEKKER    3,175,941
METHOD OF COMBATTING POWDERY MILDEW WITH PARAAMINOBENZOIC
AND CINNAMIC ACID ESTERS
Filed Jan. 2, 1962
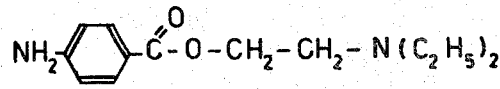 I
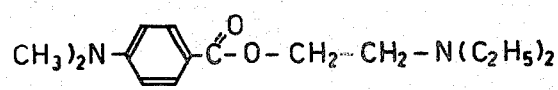 II
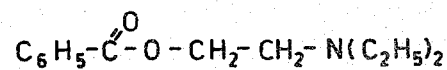 III
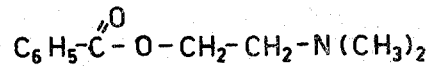 IV
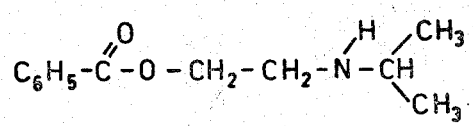 V
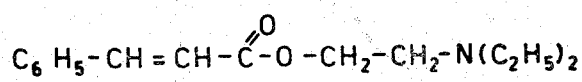 VI
INVENTOR
JOHAN DEKKER
BY *Frank R. Lufari*
AGENT United States Patent Office 3,175,941
Patented Mar. 30, 1965

3,175,941
METHOD OF COMBATTING POWDERY MILDEW
WITH PARAAMINOBENZOIC AND CINNAMIC
ACID ESTERS
Johan Dekker, Wageningen, Netherlands, assignor to
North American Philips Company, Inc., New York,
N.Y., a corporation of Delaware
Filed Jan. 2, 1962, Ser. No. 163,439
Claims priority, application Netherlands, Jan. 3, 1961,
259,662
6 Claims. (Cl. 167—30)

The known fungicidal compositions have inadequate activity or no activity at all against powdery mildew. A group of substances has been found, which was absorbed in the plants, when administered via the roots or when the leaves were dusted or sprayed herewith and which provided a very satisfactory combatting of a powery mildew infection.

The invention relates to a fungicidal composition and is characterized in that the active substance is formed by a compound of the general formula:

$$R_1-CO_2-C_2H_4-NR_2R_3$$

wherein $R_1$ is a phenyl- or ethenylphenyl-group, which may be substituted at the para position by an $NR_4R_5$-group and $R_2$, $R_3$, $R_4$ and $R_5$ designate lower alkyl-groups with not more than 3 carbon atoms or hydrogen. In said formula $R_2$ and $R_3$ cannot both designate hydrogen. These compounds are particularly useful in the form of the hydrochloride acid salt or hydrobromic acid salt thereof. It was found that the p-aminobenzoic acid diethylaminoethylester (Formula I in the accompanying drawing), as well as the N-dimethyl derivative thereof (Formula II) were very active, whereas the corresponding p-N-acetyl derivative did not exhibit or scarcely exhibited an activity. The p-N-butylamino derivative exhibited some activity, but was found to be fairly toxic. Also found to be active were the benzoic acid diethylaminoethylester (Formula III) and the benzoic acid dimethylaminoethylester (Formula IV) and the isopropylaminoethylester (Formula V), as well as the cinnamic acid diethylaminoethylester (Formula VI), whereas, on the contrary, the phenylacetic acid diethylaminoethylester did not exhibit activity.

It appears that the group of compounds is substantially only active against powdery mildew, whilst a large number of other noxious organisms tested were not affected or combatted by the said substances.

In a concentration of 1000 parts per million no activity could be assessed in vitro, even not with respect to the aforesaid kinds of mildew. The activity apears to occur only in vivo, i.e., after the plant has absorbed the composition.

The products can be dusted after mixing them with a powdery carrier or a solvent such as water, whilst in both cases a surface-active substance, particularly one of the conventional fluxing agents and, if desired, one of the conventional adhesives are added.

Dusts may be obtained in known manner by mixing or grinding in common the active substance with a solid carrier, for example talcum, kaolin, bentonite, cork powder and the like or by mixing the finely divided carrier material with a solution of the active substance in a volatile solvent. A suitable surface-active substance may be of one or more of the known anionic, cationic or neutral agents.

They may further more be added, in known manner, substances improving the adhesion, the resistance to rain and, if desired, the power of penetration, for example fatty acids, resins, glue, or the like.

The activity was determined with respect to the organisms mentioned in the following table.

Table 1

Erysiphe cichoracearum on cucumber and gherkin,
Erysiphe polygoni on peas and lupin,
Erysiphe graminis on wheat,
Spherotheca pannosa on roses,
Podosphera leucotricha on apples.

The substances were tested on cucumber plants (species long, yellow cluster) cultivated on a nutrient solution according to Hoogland. After two leaves had been developed, the plants were inoculated with a suspension of spores of Erysiphe cichoracearum. Then a hydrochloride acid salt of the compound concerned was added to the nutrient. After four days the plant was transferred to surroundings free of the active substance and after a fortnight the development of the mildrew was estimated according to a scale between 0 (no mildew) and 5 (leaves covered with mildew).

The administration of the hydrochloric acid salt of the susbtance I yielded the following results:

Table 2

| Treatment: | Mildew |
|---|---|
| Blank | 5.0 |
| 75 p.p.m. | 4.5 |
| 150 p.p.m. | 2.1 |
| 300 p.p.m. | 0.0 |

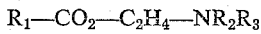
P.p.m.=parts per million.

Comparison tests with the substances mentioned on the sheet of formulae yielded the following results:

Table 3

| | 300 p.p.m. at the root |
|---|---|
| I | 0 to 0.7 |
| II | 1.2 |
| III | 0.25 |
| IV | 4 |
| V | 2 |
| VI | 1.25 |
| $H_2O$ | 4.5 to 5 |

Cucumber plants were sprayed with an aqueous solution of a hydrochloric acid salt of the active compound, with an addition of a small quantity of a surface-active substance, i.e., at the first day and at the second day after the infection with the organisms mentioned under Example I.

A few results are indicated in Table 4.

Table 4

| | On leaf 1000 p.p.m. |
|---|---|
| I | ¼ |
| II | 2 |
| III | 2⅓ |
| IV | 2¼ |
| V | 2 |
| VI | 1¼ |
| Blank ($H_2O$) | 4⅔ |

Roses in and outside a glass house were sprayed with an interval of three to four days with 0.8% of a solution of the HCl-salt of substance I, with an addition of 0.1% of "Tween 20" and 0.5% of glycerin. After a fortnight no mildew could be discovered, whilst non-treated roses were covered with mildew.

What is claimed is:
1. A method of combating powdery mildew on living plants comprising treating said plants with a member of the group consisting of a compound of the formula

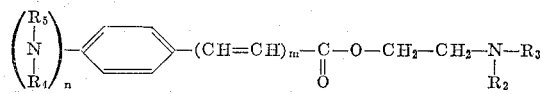

wherein $R_2$ is selected from the group consisting of hydrogen and alkyl of from 1 to 3 carbon atoms, $R_3$ is alkyl of from 1 to 3 carbon atoms, $R_4$ and $R_5$ are each selected from the group consisting of hydrogen and alkyl of from 1 to 3 carbon atoms, $m$ and $n$ are each whole numbers from 0 to 1 and the hydrochloride and hydrobromide salts thereof.

2. The method of combatting powdery mildew on living plants comprising treating such plants with a fungicidally effective amount of the hydrochloride salt of paraaminobenzoic acid diethylamino ethyl ester.

3. The method of combating powdery mildew on living plants comprising treating such plants with a fungicidally effective amount of the hydrobromide salt of paraaminobenzoic acid diethylamino ethyl ester.

4. The method of combating powdery mildew on living plants comprising treating such plants with a fungicidally effective amount of the hydrochloride salt of N,N-dimethyl-paraaminobenzoic acid diethyl aminoethyl ester.

5. The method of combating powdery mildew on living plants comprising treating such plants with a fungicidally effective amount of the hydrobromide salt of N,N-dimethyl-paraaminobenzoic acid diethyl aminoethyl ester.

6. The method of combatting powdery mildew on living plants comprising treating such plants with a fungicidally effective amount of the hydrochloride salt of cinnamic acid diethyl aminoethyl ester.

References Cited in the file of this patent
UNITED STATES PATENTS

| | | |
|---|---|---|
| 817,164 | Ermilewicz | Apr. 10, 1906 |
| 1,476,934 | Volwiler | Dec. 11, 1923 |
| 2,421,129 | Reasenberg et al. | May 27, 1947 |
| 2,486,375 | Cope | Nov. 1, 1949 |
| 2,497,394 | Cope | Feb. 14, 1950 |